United States Patent
Ishihara et al.

(10) Patent No.: US 9,722,349 B2
(45) Date of Patent: Aug. 1, 2017

(54) WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Ayumu Ishihara, Mie (JP); Tatsuya Hase, Mie (JP); Katsufumi Matsui, Mie (JP); Kouji Fukumoto, Mie (JP); Daisuke Hashimoto, Mie (JP); Kentaro Tachi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/767,140

(22) PCT Filed: Feb. 26, 2014

(86) PCT No.: PCT/JP2014/054637
§ 371 (c)(1),
(2) Date: Aug. 11, 2015

(87) PCT Pub. No.: WO2014/132984
PCT Pub. Date: Sep. 4, 2014

(65) Prior Publication Data
US 2015/0372415 A1   Dec. 24, 2015

(30) Foreign Application Priority Data
Mar. 1, 2013 (JP) .................. 2013-040327

(51) Int. Cl.
*H02G 15/02* (2006.01)
*H02G 15/08* (2006.01)
(Continued)

(52) U.S. Cl.
CPC ..... *H01R 13/5202* (2013.01); *B60R 16/0222* (2013.01); *H01B 3/423* (2013.01);
(Continued)

(58) Field of Classification Search
CPC .......... H01B 7/282; H01B 3/423; H01B 3/46; H01R 13/5202; H01R 13/5208;
(Continued)

(56) References Cited

U.S. PATENT DOCUMENTS 4,938,705 A * 7/1990 Kanno .................. H01R 13/53
439/125
6,344,612 B1 * 2/2002 Kuwahara ............. H01L 31/048
174/50

(Continued)

FOREIGN PATENT DOCUMENTS

| JP | 2002-134220 | 5/2002 |
|----|-------------|--------|
| JP | 2007-258041 | 10/2007 |

(Continued)

OTHER PUBLICATIONS

Search report from PCT/JP2014/054637, mail date is May 20, 2014.

*Primary Examiner* — Chau N Nguyen
*Assistant Examiner* — Roshn Varghese
(74) *Attorney, Agent, or Firm* — Greenblum & Bernstein, P.L.C.

(57) ABSTRACT

It is an object of the present invention to ensure a high water-stopping property of a wire harness including a waterproofing connector section that is molded from a resin, by suppressing a variation in the outer size of a seal section of the connector section. The connector section is made from a (Continued)

first synthetic resin that is insert-molded with a part of a terminal fitting of the terminated electric cable used as an insert section. A water-stopping section is made from a second synthetic resin that is insert-molded with a section extending from a part of the terminal fitting to an insulation coating of the terminated electric cable used as an insert section. The seal section is made from the second synthetic resin that is insert-molded with a part of the connector section used as an insert section. The second synthetic resin is softer than the first synthetic resin.

7 Claims, 2 Drawing Sheets

(51) Int. Cl.

| | | |
|---|---|---|
| *H01R 13/40* | (2006.01) | |
| *H01R 13/52* | (2006.01) | |
| *H01R 43/18* | (2006.01) | |
| *B60R 16/02* | (2006.01) | |
| *H01B 3/42* | (2006.01) | |
| *H01B 3/46* | (2006.01) | |
| *H01B 7/282* | (2006.01) | |
| *H01R 25/00* | (2006.01) | |
| *H01R 13/405* | (2006.01) | |
| *H01R 13/58* | (2006.01) | |

(52) U.S. Cl.
CPC .............. *H01B 3/46* (2013.01); *H01B 7/282* (2013.01); *H01R 13/5205* (2013.01); *H01R 25/003* (2013.01); *H01R 43/18* (2013.01); *H01R 13/405* (2013.01); *H01R 13/5845* (2013.01); *H01R 2201/26* (2013.01)

(58) Field of Classification Search
CPC .. H01R 13/74; H01R 13/5205; H01R 13/521; H01R 13/5845; H02G 15/04; H02G 15/23

USPC .................................................. 439/587, 694
See application file for complete search history.

(56) References Cited

U.S. PATENT DOCUMENTS

| | | | | |
|---|---|---|---|---|
| 6,482,021 | B2* | 11/2002 | Hara ................. | B29C 45/14639 439/279 |
| 7,641,494 | B2 | 1/2010 | Chen et al. | |
| 8,979,582 | B2* | 3/2015 | Tanaka ............... | H01R 13/5205 439/587 |
| 2001/0049226 | A1* | 12/2001 | Murakami ......... | H01R 13/5205 439/587 |
| 2002/0052143 | A1 | 5/2002 | Hara et al. | |
| 2002/0093830 | A1* | 7/2002 | Alloway ............ | H01R 13/5208 362/539 |
| 2004/0238200 | A1* | 12/2004 | Tanaka ............... | H01R 13/5216 174/74 R |
| 2007/0224881 | A1 | 9/2007 | Fujiwara et al. | |
| 2009/0258531 | A1* | 10/2009 | Oka .................... | H01R 13/533 439/382 |
| 2010/0075535 | A1 | 3/2010 | Mizutani et al. | |
| 2012/0040571 | A1 | 2/2012 | Yoshioka et al. | |
| 2012/0100753 | A1* | 4/2012 | Omae ................ | H01R 13/5202 439/588 |
| 2013/0017719 | A1* | 1/2013 | Tanaka ................. | H01R 9/032 439/587 |
| 2014/0106588 | A1* | 4/2014 | Suzuki ............... | H01R 13/5219 439/271 |

FOREIGN PATENT DOCUMENTS

| | | |
|---|---|---|
| JP | 2008-269858 | 11/2008 |
| WO | 2011/001840 | 1/2011 |
| WO | 2011/019027 | 2/2011 |

* cited by examiner

WIRE HARNESS

TECHNICAL FIELD

The present invention relates to a wire harness including a connector section that is molded with a terminated electric cable and an end thereof used as an insert section.

BACKGROUND ART

A wire harness that is installed in an automobile may be required to be highly impermeable to water in a section in which an end of an electric cable and a terminal fitting are connected to each other. In this case, a connector may be realized as a resin molded section for sealing a water-stopping region extending from a part of the terminal fitting to an insulation coating of the electric cable. The water-proofing resin molded section (connector) is referred to as "mold connector", for example.

The waterproofing connector is made from a synthetic resin that is insert-molded with the water-stopping region of the terminated electric cable used as an insert section. The waterproofing connector is fitted into the frame of a housing in which a device serving as a connection counterpart of the wire harness is housed. Accordingly, the connector fills the gap between the terminated electric cable and the housing. Furthermore, the connector is provided with a ring-shaped rubber seal that is sandwiched between the outer circumferential surface of the connector and the frame that forms an edge of an opening of the housing.

In other words, the waterproofing connector (resin molded section) prevents liquid from entering the connection section of the electric cable and the terminal fitting, and further prevents, in cooperation with the rubber seal, liquid from entering the housing in which the device is housed through the gap between the wire harness and the frame of the housing.

Patent Document 1 discloses that at an end of a terminated electric cable, a water-stopping section that is realized as a resin molded section of a thermoplastic elastomer resin article fills the gap between the electric cable and an electric cable guiding port of a hard connector section (resin molded section) made from a polyethylene-based resin or the like. Patent Document 1 further discloses a rubber seal being attached to the connector.

The connector section (resin molded section) disclosed in Patent Document 1 is formed in a water-stopping region of the terminated electric cable, the water-stopping region including a region extending from a wire connecting section of a terminal fitting to an insulation coating of the electric cable. In a wire harness for use in a vehicle, a wire connecting section of a terminal fitting is connected to an electric cable by being pressed against an end of the electric cable.

CITATION LIST

Patent Document

Patent Document 1: WO 2011/019027A

SUMMARY OF INVENTION

Technical Problem

Meanwhile, a wire connecting section of a terminal fitting is a part whose shape is likely to vary. Also, an insulation coating section of an electric cable is likely to deform due to a pressure from a fluid resin at the time of insert molding.

Therefore, if a hard connector section is molded with a region of a terminated electric cable that extends from the wire connecting section of the terminal fitting to the insulation coating of the electric cable used as an insert section, it will be difficult to keep a variation in the outer size of the connector section within a predetermined tolerance.

Particularly, if the insulation coating of the electric cable is made from a rubber material such as a silicone-based rubber, deformation of the insulation coating will make it more difficult to keep the outer size of the connector section within a tolerance. The variation in the outer size of the connector section results in a variation in the outer size of a rubber seal section that is attached to the outer circumferential surface of the connector section. The variation in the outer size of the rubber seal section leads to deterioration in the water-stopping property between the rubber seal and a frame of a housing into which the connector section is fitted.

Furthermore, attaching the rubber seal is troublesome and a failure in attaching the rubber seal is likely to deteriorate the water-stopping property. Moreover, if a part of the insulation coating of the electric cable is included in the insert section at the time of insert molding, the problem may occur that the insulation coating is damaged. That is, the insulation coating made from a rubber material may be damaged at an electric cable exit section of a metal mold for use in the insert molding, due to a pressure from a high-pressure fluid resin.

It is an object of the present invention to ensure a high water-stopping property of a wire harness including a waterproofing connector section that is molded from a resin, by suppressing a variation in the outer size of a seal section of the connector section.

Solution to Problem

A wire harness according to a first aspect of the present invention includes the following constituent components:

(1) A first constituent component is a terminated electric cable that includes an electric cable having a conductive wire and an insulation coating covering a circumference of the conductive wire, and a terminal fitting that is connected to the conductive wire at an end of the electric cable;

(2) A second constituent component is a connector section. This connector section is made from a first synthetic resin that is insert-molded with a part of the terminal fitting used as an insert section. The connector section seals a partial region of the terminal fitting other than a contact section to be brought into contact with a connection counterpart of the terminated electric cable, the partial region being located on the contact section side of the terminal fitting;

(3) A third constituent component is a water-stopping section. This water-stopping section is made from a second synthetic resin that is insert-molded with a section extending from a part of the terminal fitting to the insulation coating of the terminated electric cable used as an insert section. This second synthetic resin is softer than the first synthetic resin. The water-stopping section seals a water-stopping region extending from a boundary, on a side connected to the conductive wire, of the partial region of the terminal fitting that is sealed by the connector section, to the insulation coating of the electric cable;

(4) A fourth constituent component is a seal section. This seal section is made from the second synthetic resin that is insert-molded together with the water-stopping section with the connector section used as an insert section. The seal section is a ring-shaped section that is formed into one piece with the connector section over an outer circumferential surface of a part of the connector section.

A wire harness according to a second aspect of the present invention shows an aspect of the wire harness according to the first aspect. In the wire harness according to the second aspect, the connector section seals only an intermediate section of the terminal fitting that is located between the contact section and a wire connecting section connected to the conductive wire.

A wire harness according to a third aspect of the present invention shows an aspect of the wire harness according to the first or second aspect. In the wire harness according to the third aspect, a fringe of the connector section that is located opposite to the contact section side of the terminal fitting is formed overlapping the exterior of a fringe on the terminal fitting side of the water-stopping section.

A wire harness according to a fourth aspect of the present invention shows an aspect of the wire harness according to any one of the first to third aspects. In the wire harness according to the fourth aspect, the insulation coating of the electric cable is made from a rubber material.

A wire harness according to a fifth aspect of the present invention shows an aspect of the wire harness according to the fourth aspect. In the wire harness according to the fifth aspect, the insulation coating of the electric cable includes silicone, the first synthetic resin includes polybutylene terephthalate, and the second synthetic resin includes silicone.

Advantageous Effects of Invention

In the foregoing aspects, the connector section is made from a relatively hard synthetic resin, and the water-stopping section is made from a relatively soft synthetic resin. The connector section is a section that is insert-molded with a part of the terminal fitting of the terminated electric cable used as an insert section.

In other words, the soft member such as the insulation coating of the electric cable that is deformable due to a pressure of an injected resin is not included in the insert section for use when the connector section is molded. Furthermore, the seal section is a section that is insert-molded with a part of the hard connector section used as an insert section. Accordingly, it is possible to suppress a variation in the outer size of the part of the connector section on which the seal section is formed.

Therefore, by employing the wire harness according to the foregoing aspects, it is possible to ensure a high water-stopping property while suppressing a variation in the outer size of the section of the connector section that is formed into one piece with the seal section. Furthermore, no troublesome attaching of the rubber seal is needed, eliminating deterioration in the water-stopping property caused by a failure in attaching the rubber seal.

Furthermore, because the soft synthetic resin is commonly excellent in the fluidity at the time of injection molding, it is possible to keep an injection pressure of the fluid resin low when the water-stopping section is insert-molded. Accordingly, even if the insulation coating of the electric cable is made from a soft material such as a rubber material, it is possible to prevent the insulation coating from being damaged by a pressure from the fluid resin.

Furthermore, the soft synthetic resin constituting the water-stopping section is excellent in adhesiveness to the water-stopping region of the terminated electric cable as compared with a hard synthetic resin. Therefore, the soft water-stopping section that covers the water-stopping region of the terminated electric cable exerts a high water-stopping property.

Meanwhile, the wire connecting section of the terminal fitting is a section whose shape is likely to vary. If such a wire connecting section is included in the insert section for use in molding the connector section, the accuracy in size of the connector section may deteriorate.

According to the second aspect, the connector section is a section that is insert-molded with the intermediate section of the terminal fitting of the terminated electric cable used as an insert section. That is, none of the deformable soft member and the wire connecting section of the terminal fitting whose shape is likely to vary is included in the insert section for use when the connector section is molded. As a result, a variation in the outer size of the connector section is further suppressed.

Furthermore, according to the third aspect, a fringe of the connector section that is located on the wire connecting section side of the terminal fitting is formed overlapping the exterior of a fringe of the water-stopping section. Accordingly, the fringe of the deformable soft water-stopping section is prevented from being removed from the terminated electric cable.

Furthermore, according to the fourth aspect, the insulation coating of the electric cable is made from a rubber material that is significantly deformable. When the present invention is applied to a wire harness including such an electric cable, more remarkable effects can be achieved.

Furthermore, according to the fifth aspect, the insulation coating that includes silicone and the water-stopping section that includes silicone are easily adhered to each other without creating a gap, due to their compatibility. Furthermore, the connector section that includes polybutylene terephthalate and the water-stopping section and the seal section that each include silicone are easily adhered to each other without creating a gap, due to an action of the intermolecular force of hydroxyl present in the respective molecular terminals. Therefore, by the water-stopping section and the seal section being molded in the state of being in contact with the connector section, the water-stopping property and robustness of the connector section, the water-stopping section, and the seal section as a whole are improved.

DESCRIPTION OF EMBODIMENTS

Hereinafter, embodiments of the present invention will be described with reference to the accompanying drawings. The embodiments below are examples that embody the present invention and do not restrict the technical scope of the present invention.

A wire harness according to the embodiments below is a wire harness for high-voltage systems. This wire harness for high-voltage systems is laid in, for example, an electrically powered vehicle, such as a hybrid automobile or electric car, between an inverter circuit and a motor, between a charging port and a charging circuit, and the like of the electrically powered vehicle.

First Embodiment

Figure 1:
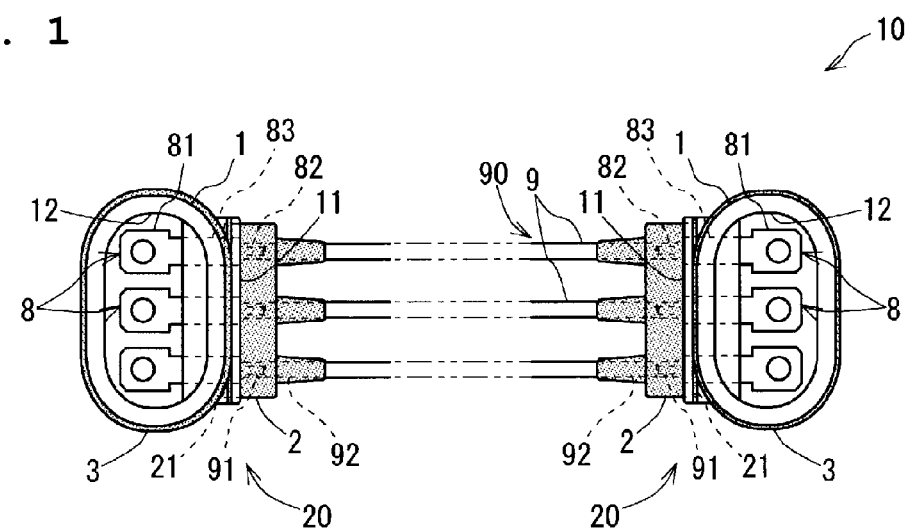
FIG. 1 is a plan view illustrating a wire harness 10 according to a first embodiment of the present invention.
Figure 2:
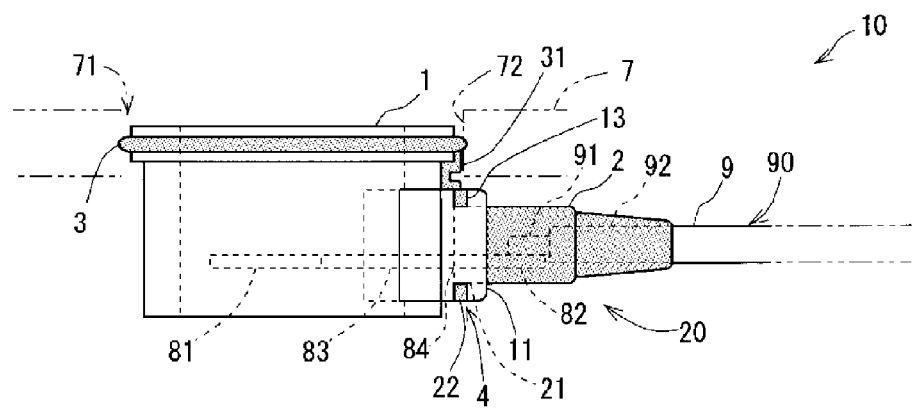
FIG. 2 is a side view illustrating an end of the wire harness 10.
Figure 3:
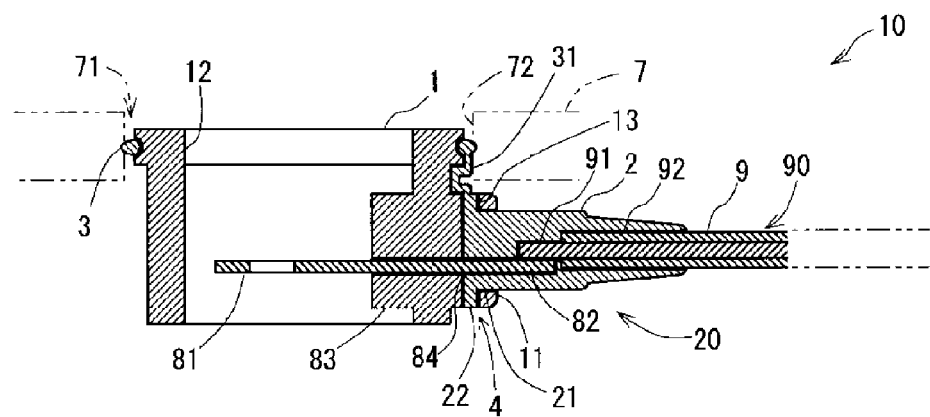
FIG. 3 is a cross-sectional view illustrating an end of the wire harness 10.

The following will first describe a configuration of a wire harness 10 according to a first embodiment of the present invention with reference to FIGS. 1 to 3. As shown in FIG. 1, the wire harness 10 includes terminated electric cables 90, and connector sections 1 and water-stopping sections 2 that are provided at the ends of the terminated electric cables 90. Furthermore, each connector section 1 has a seal section 3. Note that in FIGS. 1 and 2, the water-stopping sections 2 and the seal sections 3 are shown in hatching, for convenience.
Terminated Electric Cable Each terminated electric cable 90 includes an electric cable 9 and terminal fittings 8 connected to the ends of the electric cable 9. In the example shown in FIGS. 1 to 3, the wire harness 10 includes a plurality of terminated electric cables 90.

The electric cable 9 is an insulated electric cable that includes a conductive wire 91 and an insulation coating 92 made from a synthetic resin that covers the circumference of the conductive wire 91. The ends of the conductive wire 91 of the electric cable 9 project from the ends of the insulation coating 92.

The conductive wire 91 is a linear conductor that is made from a metal material such as copper, copper alloy, or aluminum alloy, for example. In order to obtain a flexible electric cable 9, the conductive wire 91 is preferably a twisted wire. In order to obtain a further flexible electric cable 9, the insulation coating 92 is preferably a coating made from a rubber material such as a silicone-based synthetic resin.

Each terminal fitting 8 is a terminal that is connected to the conductive wire 91 at an end of the electric cable 9. The terminal fitting 8 is a fitting made from a metal material such as copper or copper alloy. The terminal fitting 8 has a wire connecting section 82, a contact section 81, and an intermediate section 83.

The wire connecting section 82 is a section that is connected to the conductive wire 91 of the electric cable 9. For example, the wire connecting section 82 is a section in which a crimp section pressed against the conductive wire 91 is formed. Alternatively, it is also conceivable that the wire connecting section 82 is a section that is welded to the conductive wire 91 at an end of the electric cable 9 by ultrasonic welding, resistance welding, or the like.

The contact section 81 is a section that is brought into contact with a connection counterpart of the terminated electric cable 90. In the example shown in FIG. 1, the contact section 81 is a flat plate-like section having a throughhole through which a screw can be inserted. However, it is also conceivable that the contact section 81 has another shape such as a plate-like or bar-like shape without a throughhole.

The intermediate section 83 is a section between the wire connecting section 82 and the contact section 81. In the example shown in FIGS. 1 to 3, the intermediate section 83 has a flat plate-like shape. However, it is also conceivable that the intermediate section 83 has another shape such as a curved plate-like or round bar-like shape.
Connector Section The connector section 1 is a section made from a synthetic resin that is insert-molded with the intermediate section 83 of the terminal fitting 8 used as an insert section. That is, none of the wire connecting section 82 of the terminal fitting 8 whose shape is likely to vary and the insulation coating 92 of the electric cable 9 that is likely to deform due to a pressure of an injected resin is included in the insert section for use when the connector section 1 is molded.

The connector section 1 is a hard member, and is in intimate contact with the entire region in the circumferential direction of the surface of the intermediate section 83 of the terminal fitting 8. Accordingly, the connector section 1 seals the intermediate section 83 of the terminal fitting 8. The connector section 1 seals only the intermediate section 83 of the terminal fitting 8, and is not in contact with the wire connecting section 82 and the contact section 81.

The synthetic resin constituting the connector section 1 is a synthetic resin composed mainly of polybutylene terephthalate (PBT), for example. It is also conceivable that the connector section 1 is a molded member that is made from a synthetic resin composed mainly of polyamide 6T (PA6T), polypropylene (PP), an acrylonitrile-butadiene-styrene copolymer synthetic resin (ABS resin), and the like.

The connector section 1 according to the embodiment holds a plurality of terminal fittings 8 that are arranged in parallel to each other at a distance in a predetermined positional relationship. Accordingly, the ends of the plurality of terminated electric cables 90 are held in a predetermined positional relationship of being arranged in parallel and spaced apart from one another.

In the examples shown in FIGS. 1 to 3, the connector section 1 has an opening 12 through which the terminal fittings 8 can be accessed. This opening 12 is closed by a cap member (not shown) after the contact sections 81 of the terminal fittings 8 are connected to terminal sections of a counterpart device by screws or the like.

In the following description, ends of the terminated electric cables 90, a connector section 1, a water-stopping section 2, and a seal section 3 that constitute an end of the wire harness 10 are collectively referred to as a connector unit 20. The wire harness 10 shown in FIG. 1 is provided with two connector units 20 located at the two respective ends thereof.
Water-Stopping Section The water-stopping section 2 is a member made from a synthetic resin that is insert-molded with a part of the terminated electric cable 90 that includes a water-stopping region used as an insert section. In the terminated electric cable 90, the water-stopping region is a region extending from a boundary 84 on the wire connecting section 82 side of the intermediate section 83 of the terminal fitting 8 that is sealed by the connector section 1 to the insulation coating 92 of the electric cable 9.

Furthermore, the water-stopping section 2 is made from a synthetic resin that is softer than the synthetic resin from which the connector section 1 is made. The water-stopping section 2 seals the water-stopping region of the terminated electric cable 90. For example, the water-stopping section 2 is made from a silicone-based synthetic resin that has elasticity in its molded state. Alternatively, it is also conceivable that the water-stopping section 2 is made from a relatively soft synthetic resin, such as an elastomer, a polyamide-based resin, or a polyester-based resin, rather than a silicone-based synthetic resin.

The connector section 1, and the water-stopping section 2 and the seal section 3 are molded by so-called two-color molding. Accordingly, the water-stopping section 2 and the seal section 3 are respectively in contact with the connector section 1. In the two-color molding, the connector section 1 is molded, and then the water-stopping section 2 and the seal section 3 are molded in parallel.

More specifically, the connector section 1 is insert-molded, and then the water-stopping section 2 is insert-molded, with the water-stopping region on one end of the terminated electric cable 90 used as an insert section, the water-stopping region extending from a fringe 11 of the connector section 1 that is located on the wire connecting section 82 side to the insulation coating 92 of the electric cable 9.

In parallel to the molding of the water-stopping section 2, the seal section 3 is insert-molded with a part of the connector section 1 that is fitted into a frame 72 of a housing 7 used as an insert section.

Furthermore, in the example shown in FIGS. 2 and 3, the fringe 11 of the connector section 1 that is located on the wire connecting section 82 side of the terminal fitting 8 is formed overlapping the exterior of a fringe 21 on the terminal fitting 8 side of the water-stopping section 2.

Furthermore, as shown in FIGS. 2 and 3, a part of the connector section 1 and a part of the water-stopping section 2 can be considered to configure a fitting mechanism 4 such that they have a protrusion and a recess that are fitted to each other in a direction crossing the extending direction of the electric cable 9 (axial direction).

In the example shown in FIGS. 2 and 3, a fitting mechanism 4 is provided in which a recess 13 of the connector section 1 and a protrusion 22 of the water-stopping section 2 are fitted to each other in a direction perpendicular to the extending direction of the electric cable 9.

Seal Section

The seal section 3 is a ring-shaped elastic member that is formed into one piece with the connector section 1 over the outer circumferential surface of a part of the connector section 1. The seal section 3 is formed over the part of the outer circumferential surface of the connector section 1 that is fitted into the frame 72 of the housing 7 in which a device serving as a connection counterpart of the wire harness 10 is housed. The frame 72 is a section that forms an edge of the opening 71 of the housing 7. Note that in FIGS. 2 and 3, the housing 7 is depicted by phantom lines (alternate long and two short dashed lines).

By a part of the connector section 1 being fitted into the frame 72 of the housing 7, the seal section 3 is sandwiched between the outer circumferential surface of the connector section 1 and the frame 72 of the housing 7. Accordingly, the seal section 3 fills the gap between the outer circumferential surface of the connector section 1 and the frame 72 of the housing 7.

Furthermore, the connector section 1 is molded, then the water-stopping section 2 is molded, and the seal section 3 is molded together with the water-stopping section 2 using the same material as that of the water-stopping section 2. In other words, the water-stopping section 2 and the seal section 3 are molded in parallel, by a single insert molding process using the section of the connector section 1 on which the seal section 3 is to be formed and the water-stopping region of the terminated electric cable 90 as insert sections. The material of the water-stopping section 2 and the seal section 3 is the same synthetic resin. For example, the material of the water-stopping section 2 and the seal section 3 is an elastic material such as a synthetic resin composed mainly of silicone.

Furthermore, in the example shown in FIGS. 2 and 3, a coupling section 31 for coupling the water-stopping section 2 to the seal section 3 is formed. The coupling section 31 is an elastic member that is formed into one piece with the connector section 1 on the surface of the connector section 1. The coupling section 31 is molded together with the water-stopping section 2 and the seal section 3 using the same material as that of the water-stopping section 2 and the seal section 3.

The coupling section 31 is formed as a section that couples the water-stopping section 2 and the seal section 3 when the water-stopping section 2 and the seal section 3 are molded by injecting a fluid resin into a continuous cavity of the metal mold.

Effects

In the wire harness 10, the connector section 1 is made from a relatively hard synthetic resin, and the water-stopping section 2 is made from a relatively soft synthetic resin. The connector section 1 is a section that is insert-molded with a part of the terminal fitting 8 of the terminated electric cable 90 used as an insert section.

That is, the insulation coating 92 of the electric cable 9 that is likely to deform due to a pressure of an injected resin is not included in the insert section for use when the connector section 1 is molded. Furthermore, the seal section 3 is a section that is insert-molded with a part of the hard connector section 1 used as an insert section. Therefore, it is possible to suppress a variation in the outer size of the section of the connector section 1 on which the seal section 3 is formed.

Accordingly, by employing the wire harness 10, it is possible to ensure a high water-stopping property while suppressing a variation in the outer size of the section of the connector section 1 that is formed into one piece with the seal section 3. Furthermore, no troublesome attaching of the rubber seal is needed, eliminating deterioration in the water-stopping property caused by a failure in attaching the rubber seal.

Furthermore, because a soft synthetic resin such as a silicone-based synthetic resin is commonly excellent in the fluidity at the time of injection molding, it is possible to keep an injection pressure of the fluid resin low when the water-stopping section 2 is insert-molded. Accordingly, even if the insulation coating 92 of the electric cable 9 is made from a soft material such as a rubber material, it is possible to prevent the insulation coating 92 from being damaged by a pressure from the fluid resin.

Furthermore, the soft synthetic resin constituting the water-stopping section 2 is excellent in adhesiveness to the water-stopping region of the terminated electric cable 90 as compared with a hard synthetic resin. Therefore, the soft water-stopping section 2 that covers the water-stopping region of the terminated electric cable 90 exerts a high water-stopping property.

Furthermore, in the wire harness 10, the connector section 1 is a section that is insert-molded with the intermediate section 83 of the terminal fitting 8 of the terminated electric cable 90 used as an insert section. In this case, none of the deformable soft insulation coating 92 and the wire connecting section 82 of the terminal fitting 8 whose shape is likely to vary is included in the insert section for use when the connector section 1 is molded. As a result, a variation in the outer size of the connector section 1 is further suppressed.

Furthermore, the fringe 11 of the connector section 1 that is located on the wire connecting section 82 side of the terminal fitting 8 is formed overlapping the exterior of the fringe 21 of the water-stopping section 2. Accordingly, the fringe 21 of the deformable soft water-stopping section 2 is prevented from being removed from the terminated electric cable 90. Note that the fringe 11 of the connector section 1 is a fringe located on the side opposite to the contact section 81 side of the terminal fitting 8.

Furthermore, the structure of the connector units 20 of the wire harness 10 exerts more remarkable effects when the insulation coatings 92 of the electric cables 9 are made from a deformable rubber material.

Furthermore, the insulation coating 92 that includes silicone and the water-stopping section 2 that includes silicone are easily adhered to each other without creating a gap, due to their compatibility. Furthermore, the connector section 1 that includes polybutylene terephthalate, and the water-stopping section 2 and the seal section 3 that each include silicone are easily adhered to each other without creating a gap, due to an action of the intermolecular force of hydroxyl present in the respective molecular terminals. Therefore, by the water-stopping section 2 and the seal section 3 being molded in the state of being in contact with the connector section 1, the water-stopping property and robustness of the connector section 1, the water-stopping section 2, and the seal section 3 as a whole are improved.

Second Embodiment

Figure 4:
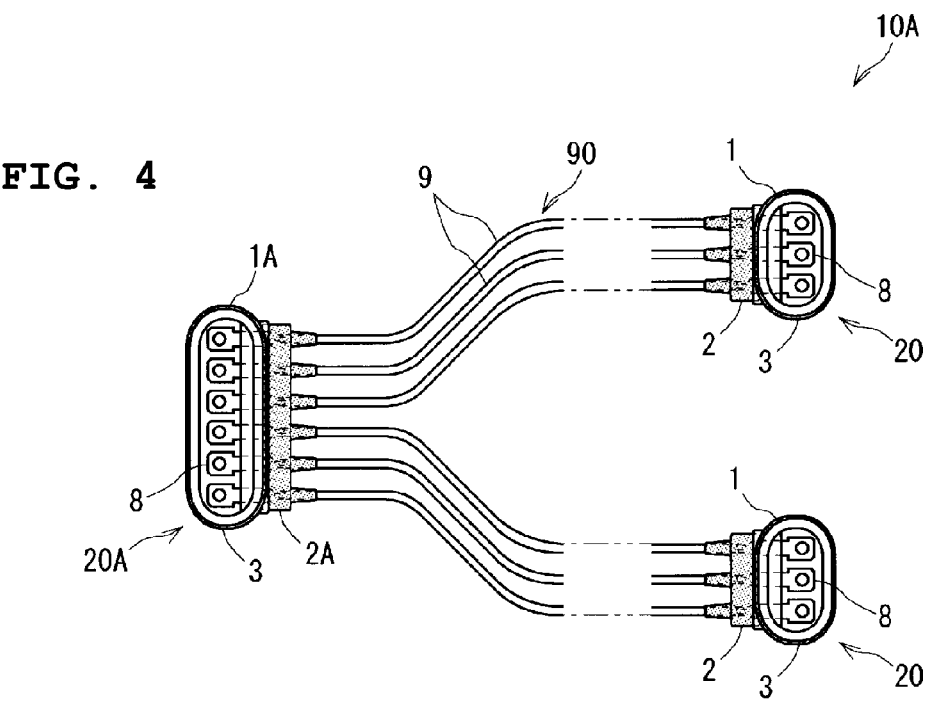
FIG. 4 is a plan view illustrating a wire harness 10A according to a second embodiment of the present invention.

Hereinafter, a wire harness 10A according to a second embodiment of the present invention will be described with reference to FIG. 4. This wire harness 10A differs from the wire harness 10 shown in FIGS. 1 to 3 in having a branched structure. In FIG. 4, the same reference numerals are given to the same constituent components as those shown in FIGS. 1 to 3. The following will describe only the difference of the wire harness 10A from the wire harness 10.

Note that FIG. 4 is a plan view illustrating the wire harness 10A.

As shown in FIG. 4, the wire harness 1A has a structure in which a plurality of terminated electric cables 90 arranged in parallel to each other are branched in the middle. In the example shown in FIG. 4, six terminated electric cables 90 are held altogether at ends on one side by one pair of a connector section 1A and a water-stopping section 2A. At ends on the other side, the six terminated electric cables 90 are divided into two groups of three terminated electric cables 90 and held by two pairs of the connector section 1 and the water-stopping section 2.

Note that the connector section 1A and the water-stopping section 2A have structures similar to those of the connector section 1 and the water-stopping section 2, except for the number of the terminated electric cables 90 serving as insert sections. The embodiments of the present invention also encompasses the wire harness 1A shown in FIG. 4.

Other Embodiments

The wire harnesses 10 and 10A include a plurality of terminated electric cables 90, and the connector sections 1 and the water-stopping sections 2 that cover the ends of the plurality of terminated electric cables 90 altogether. However, it is also conceivable that the structures of the connector sections 1, the water-stopping sections 2, and the seal sections 3 of the wire harnesses 10 and 10A are applied to a case including a single terminated electric cable 90.

Note that the wire harness according to the present invention may also be configured by freely combining the foregoing embodiments, or modifying or partially deleting the foregoing embodiments in a suitable manner, within the scope of the invention according to the claims.

LIST OF REFERENCE NUMERALS 1, 1A Connector section
2, 2A Water-stopping section
3 Seal section
4 Fitting mechanism
7 Housing
8 Terminal fitting
9 Wire
10, 10A Wire harness
11 Fringe of connector section
12 Opening of connector section
13 Recess of connector section
20 Connector unit
21 Fringe of water-stopping section
22 Protrusion of water-stopping section
70 Opening of housing
72 Frame of housing
81 Contact section
82 Wire connecting section
83 Intermediate section
84 Boundary
90 Terminated electric cable
91 Conductive wire
92 Insulation coating

The invention claimed is:

1. A wire harness comprising:
a terminated electric cable that includes an electric cable having a conductive wire and an insulation coating covering a circumference of the conductive wire, and a terminal fitting that is connected to the conductive wire at an end of the electric cable;
a connector that is made from a first synthetic resin that is insert-molded with a part of the terminal fitting used as an insert section, the connector sealing a partial region of the terminal fitting other than a contact section to be brought into contact with a connection counterpart of the terminated electric cable, the partial region being located on the contact section side of the terminal fitting;
a water-stopping portion that is made from a second synthetic resin that is softer than the first synthetic resin and insert-molded with a section extending from a part of the terminal fitting to the insulation coating of the terminated electric cable used as an insert section, the water-stopping portion sealing a water-stopping region extending from a boundary, on a side connected to the conductive wire, of the partial region of the terminal fitting that is sealed by the connector, to the insulation coating of the electric cable;
a ring-shaped seal portion that is made from the second synthetic resin and that is insert-molded together with the water-stopping portion with the connector used as an insert section, the ring-shaped seal portion being formed into one piece with the connector over an outer circumferential surface of a portion of the connector, and
a coupling portion formed into one molded piece together with and connecting the water-stopping portion and the ring-shaped seal portion,
the coupling portion connecting the water-stopping portion and the seal portion without penetrating the connector.

2. The wire harness according to claim 1,
wherein the connector seals only an intermediate section of the terminal fitting that is located between the contact section and a wire connecting section connected to the conductive wire.

3. The wire harness according to claim 1,
wherein a fringe of the connector that is located opposite to the contact section side of the terminal fitting is formed overlapping the exterior of a fringe on the terminal fitting side of the water-stopping portion.

4. The wire harness according to claim 1,
wherein the insulation coating of the electric cable is made from a rubber material.

5. The wire harness according to claim 4,
wherein the insulation coating of the electric cable includes silicone,
the first synthetic resin includes polybutylene terephthalate, and
the second synthetic resin includes silicone.

6. The wire harness according to claim 1,
wherein the connector includes a cylindrical portion opening to a direction intersecting the extension direction of the conductive wire; and
the coupling portion is formed along the outer circumferential surface of the cylindrical portion.

7. The wire harness according to claim 1,
wherein the surface of the connection between the conductive wire and the terminal fitting is covered only by the water-stopping portion.

\* \* \* \* \*